(12) United States Patent
Matusik et al.

(10) Patent No.: US 11,766,831 B2
(45) Date of Patent: Sep. 26, 2023

(54) CALIBRATION FOR ADDITIVE MANUFACTURING

(71) Applicant: Inkbit, LLC, Medford, MA (US)

(72) Inventors: Wojciech Matusik, Lexington, MA (US); Desai Chen, Arlington, MA (US); Javier Ramos, Brookline, MA (US); Aaron Weber, Arlington, MA (US); Harrison Wang, New York, NY (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/560,515

(22) Filed: Dec. 23, 2021

(65) Prior Publication Data

US 2022/0111601 A1   Apr. 14, 2022

Related U.S. Application Data

(63) Continuation-in-part of application No. PCT/US2021/030647, filed on May 4, 2021.

(51) Int. Cl.
| | |
|---|---|
| *B29C 64/393* | (2017.01) |
| *B33Y 50/02* | (2015.01) |
| *B29C 64/209* | (2017.01) |
| *G06T 7/80* | (2017.01) |
| *G06T 3/00* | (2006.01) |
| *B29C 64/245* | (2017.01) |

(52) U.S. Cl.
CPC .......... *B29C 64/393* (2017.08); *B29C 64/209* (2017.08); *B29C 64/245* (2017.08); *G06T 3/0006* (2013.01); *G06T 7/85* (2017.01); *B33Y 50/02* (2014.12)

(58) Field of Classification Search
CPC .......... B22F 10/31; B22F 12/50; B22F 12/53; B22F 12/55; B22F 12/90; B22F 2999/00; B29C 64/106; B29C 64/209; B29C 64/245; B29C 64/393; B33Y 30/00; B33Y 50/02; G06T 3/0006; G06T 7/85; Y02P 10/25

See application file for complete search history.

(56) References Cited

U.S. PATENT DOCUMENTS

| | | | |
|---|---|---|---|
| 5,460,758 | A | 10/1995 | Langer et al. |
| 6,492,651 | B2 | 12/2002 | Kerekes |
| 8,237,788 | B2 | 8/2012 | Cooper et al. |
| 9,259,931 | B2 | 2/2016 | Moreau et al. |

(Continued)

FOREIGN PATENT DOCUMENTS

| | | |
|---|---|---|
| EP | 2186625 B1 | 12/2016 |
| EP | 3459716 A1 | 3/2019 |

(Continued)

OTHER PUBLICATIONS

Alarousu, Erkki, Ahmed AlSaggaf, and Ghassan E. Jabbour. "Online monitoring of printed electronics by spectral-domain optical coherence tomography." Scientific reports 3 (2013): 1562.

(Continued)

*Primary Examiner* — Yuhui R Pan
(74) *Attorney, Agent, or Firm* — Occhiuti & Rohlicek LLP

(57) ABSTRACT

An additive fabrication approach involves fabricating a platform on a build plate. The fabrication system is then calibrated based on the fabricated platform, and an object is then fabricating on the fabricated platform according to the calibration.

15 Claims, 7 Drawing Sheets

(56) References Cited

U.S. PATENT DOCUMENTS

| | | | |
|---|---|---|---|
| 9,562,759 B2 | 2/2017 | Vogler et al. | |
| 9,697,604 B2 | 7/2017 | Wang et al. | |
| 9,952,506 B2 | 4/2018 | Arai et al. | |
| 10,011,071 B2 | 7/2018 | Batchelder | |
| 10,252,466 B2 | 4/2019 | Ramos et al. | |
| 10,456,984 B2 | 10/2019 | Matusik et al. | |
| 10,725,446 B2 | 7/2020 | Mercelis | |
| 10,926,473 B1 | 2/2021 | Matusik et al. | |
| 10,994,490 B1 | 5/2021 | Matusik et al. | |
| 2002/0104973 A1 | 8/2002 | Kerekes | |
| 2004/0085416 A1 | 5/2004 | Kent | |
| 2004/0114002 A1 | 6/2004 | Kosugi et al. | |
| 2004/0173946 A1 | 9/2004 | Pfeifer et al. | |
| 2006/0007254 A1 | 1/2006 | Tanno et al. | |
| 2007/0106172 A1 | 5/2007 | Abreu | |
| 2007/0241482 A1 | 10/2007 | Giller et al. | |
| 2008/0124475 A1* | 5/2008 | Kritchman | B29C 48/92 427/421.1 |
| 2009/0073407 A1 | 3/2009 | Okita | |
| 2009/0105605 A1 | 4/2009 | Abreu | |
| 2009/0220895 A1 | 9/2009 | Garza et al. | |
| 2009/0279089 A1 | 11/2009 | Wang | |
| 2009/0279098 A1 | 11/2009 | Ohbayashi et al. | |
| 2010/0140550 A1 | 6/2010 | Keller et al. | |
| 2010/0158332 A1 | 6/2010 | Rico et al. | |
| 2012/0275148 A1 | 11/2012 | Yeh et al. | |
| 2013/0182260 A1 | 7/2013 | Bonnema et al. | |
| 2013/0328227 A1 | 12/2013 | McKinnon et al. | |
| 2014/0249663 A1 | 9/2014 | Voillaume | |
| 2014/0300676 A1 | 10/2014 | Miller et al. | |
| 2014/0328963 A1 | 11/2014 | Mark et al. | |
| 2015/0061178 A1 | 3/2015 | Siniscalchi et al. | |
| 2015/0101134 A1 | 4/2015 | Manz et al. | |
| 2015/0124019 A1 | 5/2015 | Cruz-Uribe et al. | |
| 2015/0140295 A1 | 5/2015 | Okamoto | |
| 2015/0352792 A1 | 12/2015 | Kanada | |
| 2016/0018404 A1 | 1/2016 | Iyer et al. | |
| 2016/0023403 A1* | 1/2016 | Ramos | B29C 64/393 425/171 |
| 2016/0101568 A1 | 4/2016 | Mizes et al. | |
| 2016/0157751 A1 | 6/2016 | Mahfouz | |
| 2016/0167301 A1 | 6/2016 | Cole et al. | |
| 2016/0185044 A1 | 6/2016 | Leonard et al. | |
| 2016/0209319 A1 | 7/2016 | Adalsteinsson et al. | |
| 2016/0249836 A1 | 9/2016 | Gulati et al. | |
| 2016/0320771 A1 | 11/2016 | Huang | |
| 2016/0347005 A1 | 12/2016 | Miller | |
| 2017/0021455 A1 | 1/2017 | Dallarosa et al. | |
| 2017/0050374 A1 | 2/2017 | Minardi et al. | |
| 2017/0078524 A1 | 3/2017 | Tajima et al. | |
| 2017/0087766 A1 | 3/2017 | Chung et al. | |
| 2017/0106604 A1 | 4/2017 | Dikovsky et al. | |
| 2017/0120337 A1 | 5/2017 | Kanko et al. | |
| 2017/0125165 A1 | 5/2017 | Prest | |
| 2017/0132355 A1 | 5/2017 | Vasquez et al. | |
| 2017/0143494 A1 | 5/2017 | Mahfouz | |
| 2017/0217103 A1 | 8/2017 | Babaei et al. | |
| 2017/0235293 A1 | 8/2017 | Shapiro et al. | |
| 2017/0355147 A1 | 12/2017 | Buller et al. | |
| 2017/0372480 A1 | 12/2017 | Anand et al. | |
| 2018/0017501 A1 | 1/2018 | Trenholm et al. | |
| 2018/0036964 A1 | 2/2018 | DehghanNiri et al. | |
| 2018/0056288 A1 | 3/2018 | Abate et al. | |
| 2018/0056582 A1 | 3/2018 | Matusik et al. | |
| 2018/0071984 A1 | 3/2018 | Lee et al. | |
| 2018/0095450 A1 | 4/2018 | Lappas et al. | |
| 2018/0099333 A1 | 4/2018 | DehghanNiri et al. | |
| 2018/0143147 A1 | 5/2018 | Milner et al. | |
| 2018/0154580 A1 | 6/2018 | Mark | |
| 2018/0169953 A1 | 6/2018 | Matusik et al. | |
| 2018/0194066 A1 | 7/2018 | Ramos et al. | |
| 2018/0273657 A1 | 9/2018 | Wang et al. | |
| 2018/0275636 A1 | 9/2018 | Zhao et al. | |
| 2018/0281067 A1 | 10/2018 | Small et al. | |
| 2018/0297113 A1 | 10/2018 | Preston et al. | |
| 2018/0304540 A1 | 10/2018 | Tobia et al. | |
| 2018/0304549 A1 | 10/2018 | Safai et al. | |
| 2018/0311893 A1 | 11/2018 | Choi et al. | |
| 2018/0320006 A1 | 11/2018 | Lee et al. | |
| 2018/0341248 A1 | 11/2018 | Mehr et al. | |
| 2018/0348492 A1 | 12/2018 | Pavlov et al. | |
| 2018/0361668 A1 | 12/2018 | Kim et al. | |
| 2019/0056717 A1 | 2/2019 | Kothari et al. | |
| 2019/0077921 A1 | 3/2019 | Eckel | |
| 2019/0118300 A1 | 4/2019 | Penny et al. | |
| 2019/0230248 A1 | 7/2019 | Mizes et al. | |
| 2019/0270254 A1 | 9/2019 | Mark et al. | |
| 2019/0271966 A1 | 9/2019 | Coffman et al. | |
| 2019/0283329 A1 | 9/2019 | Lensgraf et al. | |
| 2019/0322031 A1 | 10/2019 | Kritchman | |
| 2019/0329322 A1 | 10/2019 | Preston et al. | |
| 2019/0346830 A1 | 11/2019 | de Souza Borges Ferreira et al. | |
| 2019/0353767 A1 | 11/2019 | Eberspach et al. | |
| 2019/0389123 A1 | 12/2019 | Parker et al. | |
| 2020/0004225 A1 | 1/2020 | Buller et al. | |
| 2020/0122388 A1 | 4/2020 | Van Esbroeck et al. | |
| 2020/0143006 A1 | 5/2020 | Matusik et al. | |
| 2020/0147888 A1 | 5/2020 | Ramos et al. | |
| 2020/0215761 A1 | 7/2020 | Chen et al. | |
| 2020/0223143 A1 | 7/2020 | Gurdiel Gonzalez et al. | |
| 2020/0247063 A1 | 8/2020 | Pinskiy et al. | |
| 2020/0353684 A1 | 11/2020 | Dudley et al. | |
| 2020/0399411 A1 | 12/2020 | Shpayzer et al. | |
| 2021/0362225 A1* | 11/2021 | Yun | B33Y 10/00 |

FOREIGN PATENT DOCUMENTS

| | | | | |
|---|---|---|---|---|
| EP | 3527352 A1 | 8/2019 | | |
| JP | 2014098555 A | 5/2014 | | |
| JP | 6220476 B1 | 10/2017 | | |
| JP | 2018103488 A | 7/2018 | | |
| KR | 101567281 B1 | 11/2015 | | |
| KR | 20180067961 A | 6/2018 | | |
| WO | 98/45141 A2 | 10/1998 | | |
| WO | 2003/026876 A2 | 4/2003 | | |
| WO | WO-2015174867 A1 * | 11/2015 | | B29C 64/106 |
| WO | 2017066077 A1 | 4/2017 | | |
| WO | 2018080397 A1 | 5/2018 | | |
| WO | 2018197376 A1 | 11/2018 | | |
| WO | 2018209438 A1 | 11/2018 | | |
| WO | 2018217903 A1 | 11/2018 | | |
| WO | 2019070644 A2 | 4/2019 | | |
| WO | 2019125970 A1 | 6/2019 | | |
| WO | 2020123479 A1 | 6/2020 | | |
| WO | 2020/146490 A1 | 7/2020 | | |
| WO | 2020145982 A1 | 7/2020 | | |
| WO | WO-2020231962 A1 * | 11/2020 | | B41J 2/04505 |
| WO | 2020264314 A1 | 12/2020 | | |

OTHER PUBLICATIONS

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken, Lennart "Learning and repetitive control for complex systems: with application to large format printers." (2019).

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb 2, 2015), p. 35701, XP020281675, ISSN: 0957-0233, DOI: 10.1088/0957-0233/26/3/035701 [retrieved on Feb. 2, 2015].

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

(56) References Cited

OTHER PUBLICATIONS

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.
Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.
Klein, Thomas, and Robert Huber. "High-speed OCT light sources and systems." Biomedical optics express 8, No. 2 (2017): 828-859.
Kulik, Eduard A., and Patrick Calahan. "Laser profilometry of polymeric materials." Cells and Materials 7, No. 2 (1997): 3.
Moon, Sucbei, and Dug Young Kim. "Ultra-high-speed optical coherence tomography with a stretched pulse supercontinuum source." Optics Express 14, No. 24 (2006): 11575-11584.
Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.
Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2018, Engineering 5 (2019) 721-729. (Year: 2019).
Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.
Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.
Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.
Zhou, Chao, Aneesh Alex, Janarthanan Rasakanthan, and Yutao Ma. "Space-division multiplexing optical coherence tomography." Optics express 21, No. 16 (2013): 19219-19227.
Yu C, Jiang J. A Perspective on Using Machine Learning in 3D Bioprinting. Int J Bioprint. Jan. 24, 2020;6(1):253. doi: 10.18063/ijb.v6i1.253.
Goh, G.D., Sing, S.L. & Yeong, W.Y. A review on machine learning in 3D printing: applications, potential, and challenges. Artif Intell Rev 54, 63-94 (2021). https://doi.org/10.1007/s10462-020-09876-9.
Optimal shape morphing control of 4D printed shape memory polymer based on reinforcement learning Robotics and Computer-Integrated Manufacturing (IF5.666), Pub Date : Jul. 17, 2021, DOI: 10.1016/j.rcim.2021.102209.
Zhao, Xiaozhou, Julia A. Bennell, Tolga Bekta?, and Kath Dowsland. "A comparative review of 3D container loading algorithms." International Transactions in Operational Research 23, No. 1-2 (2016): 287-320.
Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675.
Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL.
Piovarci, Michal, Michael Foshey, Timothy Erps, Jie Xu, Vahid Babaei, Piotr Didyk, Wojciech Matusik, Szymon Rusinkiewicz, and Bernd Bickel. "Closed-Loop Control of Additive Manufacturing via Reinforcement Learning." (2021).
Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

\* cited by examiner

CALIBRATION FOR ADDITIVE MANUFACTURING

CROSS-REFERENCES TO RELATED APPLICATIONS

This application is a Continuation-in-Part of International Application PCT/US21/30647, filed 4 May 2021, the contents of which are incorporated herein by reference.

BACKGROUND OF THE INVENTION

This invention relates to calibration for additive manufacturing.

Vision feedback for jetted additive fabrication has been shown to provide highly accurate fabrication of objects in view of systematic and random variations in the fabrication process. Such approaches are described, for example, in U.S. Pat. Nos. 10,252,466 and 10,456,984. Accuracy of such systems relies on accurate calibration of various system components, including printheads, a vision system, and the motion system that controls the relative motion of the object being fabricated and the printheads.

SUMMARY OF THE INVENTION

In a general aspect, a jetted additive fabrication system may improve accuracy by calibrating the system after forming (i.e., printing) a fabrication platform prior to forming the object to be fabricated. This fabrication platform may have desirable structure, for example, being formed with an orientation such that a distance between a surface of an object being fabricated remains substantially constant, for example, during the relative motion of the object and the printheads, as well as between the object and the sensing system. Having formed such a fabrication platform, calibration (or updating of an existing calibration) of the system based on this platform may provide higher accuracy and/or repeatability than is obtained using prior vision feedback based additive fabrication.

In one aspect, in general, a method for calibration of an additive fabrication system a fabricating a fabrication platform (234) on a first build plate (220). The system is calibrated by determining geometric relationships between a printhead (112), a sensing system (118), and a motion system for controllably moving the first build plate. An object (250) is then fabricated on the fabricated platform (234) positioned on the fabricated platform according to the determined first geometric relationships.

Aspects may include one or more of the following features.

The motion system includes at least a first motion direction ($\vec{m}_x$), and fabricating the fabrication platform includes fabricating said platform to be parallel to the first motion direction.

The motion system includes at least a second motion direction ($\vec{m}_y$) substantially perpendicular to the first motion direction and fabricating the fabrication platform includes fabricating said platform to be parallel to the second motion direction.

The fabricating of the object comprises depositing successive layers of material, and wherein said depositing a layer comprises continuously moving the object relative to the printhead along the first motion direction causing the distance between the printhead and a surface of the object to remain substantially constant.

The depositing of the layer includes moving the object in the second motion direction.

The calibrating of the additive fabrication system includes fabricating markers (236, 237) on the fabrication platform (234), and wherein determining the first geometric relationships includes sensing said markers using the sensing system.

The printhead comprises a printhead assembly (1012-1) having a plurality of printheads (1013-1A to 1013-1D), and wherein the calibrating of the additive fabrication system includes fabricating a plurality of markers (1040-1A to 1040-1D) with the printheads.

The calibrating of the additive fabrication system further includes determining relative locations of the markers from a scan of the fabricated platform after the fabricating of the markers.

The method further comprises, prior to the fabricating of the fabrication platform, determining second geometric relationships between the motion system and a second build plate.

The determining of the second geometric relationship comprises scanning markers formed in the second build plate.

The second build plate is a separate build plate, and the second build plate is removed from the fabrication system and the first build plate is installed in the fabrication system prior to fabrication of the fabrication platform on the first build plate.

The fabricating of the fabrication platform comprises fabricating said platform using a support material.

The forming of the fabrication platform includes forming said platform in contact an edge element (336A-E) for bonding the fabrication platform to the first build plate.

The method further comprises fabricating the edge elements on the first build plate.

In another aspect, in general, an additive fabrication system is configured to perform all the steps of any of the methods set forth above.

In another aspect, in general, software stored on a machine-readable medium, when executed by a processor causes all the steps of any of the methods set forth above to be performed by the processor and/or by an additive fabrication system under control of the processor.

Other features and advantages of the invention are apparent from the following description, and from the claims.

DETAILED DESCRIPTION

Figure 1:
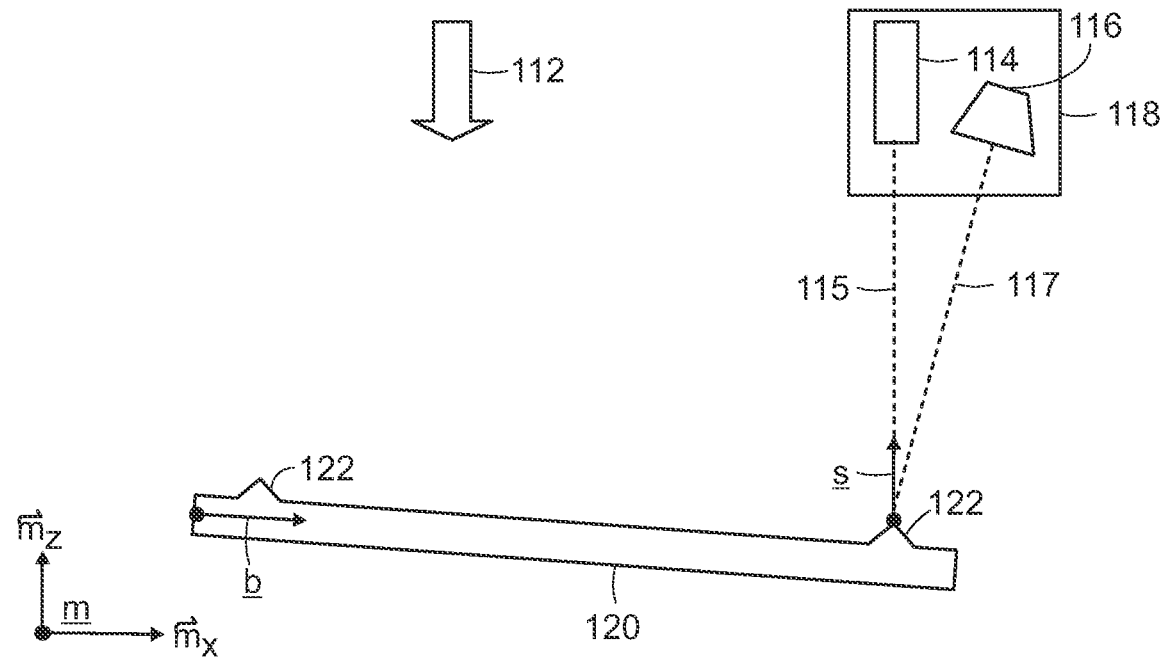
FIG. 1 is a schematic side view of a calibration build plate in an additive fabrication system.

An embodiment described below relates to a vision-feedback jetted additive fabrication, for example, as described in co-pending application Ser. No. 17/197,581, filed 10 Mar. 2021, which is incorporated herein by reference. As described in that application, a set of fixed printheads, for example, one printhead used for a different material, and each printhead having a linear array of jets, is used to eject material toward a moving build plate, whose motion is controllable in three dimensions. Successive layers of material are deposited during motion of the build platform in a first direction ($\vec{m}_x$), in general with multiple passes being made for each layer in order to build objects wider than the jet arrays of the printheads by offsetting the build platform in a second direction ($\vec{m}_y$), which is substantially but not necessarily exactly, perpendicular to the first direction. In the embodiment described in the co-pending application, as layers are added to a partially fabricated object the build platform is lowered in a third direction ($\vec{m}_z$), which is substantially but not necessarily exactly perpendicular to the plane defined by the first and second directions. Although such lowering may not be required in all embodiments, there are advantages to maintaining a small range of variation of the distance between the printheads and the surface on which layers are deposited, for example, to keep the distance as small as possible without causing physical interference between the printheads and the object. The small distance may for example, limit undesirable effects such as variations in the flight path of drops caused by air currents, or variations in the shapes of drops caused by fluid dynamics effects (e.g., caused by flow of air over the ink drops, surface tension, etc.).

This embodiment also makes use of vision-based feedback, for example, as described in U.S. Pat. Nos. 10,252,466 and 10,456,984, which are incorporated herein by reference. Generally, an optical sensor is used to measure the surface geometry, and optionally material identity or properties, and these measurements are used in a feedback arrangement to control the emission of material from the jets, for example, determining which and how much material to emit as the build platform moves under the printheads. As introduced above, there may be good reasons for maintaining a consistent distance between the printheads and the surface being printed on (i.e., by lowering the build platform as layers are added to the object being fabricated) for the sake of accurate depositing of material. Furthermore, maintaining the surface within a small range of distance from the surface sensor (e.g., a laser profilometer), greater accuracy and/or consistency may be achieved as compared to the surface sensor having to accommodate a wider range of distance.

Calibration of the relative locations and orientations of various components of the printing system are important to achieving high-precision fabrications. Some approaches to such calibration are described in U.S. Pat. No. 10,994,490, titled "Calibration for Additive Manufacturing," issued 4 May 2021, which is incorporated herein by reference. Generally, the embodiments described below extend the calibration approaches in the above-referenced patent and/or adapt to imperfect alignment of components of the system.

Referring to FIG. 1, a schematic side view of a calibration build plate 120 (e.g., a metal, ceramic, or other rigid and stable material) includes precisely fabricated geometric structures on its upper surface (i.e., the surface exposed to the printheads and scanner). In this schematic, these geometric structures include fiducial markers 122, which have known shape in a frame of reference of the calibration build plate, which is denoted $\underline{b}=(\vec{b}_x, \vec{b}_y, \vec{b}_z)$ and which defines an orthogonal coordinate system in physical units (e.g., millimeters). That is, the fiducial markers are precisely formed on the calibration build plate at known locations on the $\vec{b}_x \times \vec{b}_z$ plane and known heights in the $\vec{b}_z$ direction from the plane. A location of a marker on the build platform may be denoted $\underline{\beta}=(\beta_x, \beta_y, \beta_z)$ such that the vector location (i.e., offset on the build plate) corresponds to a vector $\underline{\beta}\cdot\underline{b}$, (the dot representing an inner product).

In this embodiment, build plates are removable, for example, permitting sequential printing of objects by removing a build plate on which a completed object has been fabricated, and installing a new empty build plate for the next object. Similarly, the calibration build plate 120 may be installed in the same manner. The installation of a build plate is somewhat repeatable, but not necessarily with the precision needed for fabrication.

When installed in the printer, the build plate is movable in three dimensions with three directional drive mechanisms. These directions are denoted $\vec{m}_x$ (a vector in a universal frame of reference of the printer) for the primary direction of (continuous) motion while the material is jetted on the object, and $\vec{m}_y$ for a direction approximately perpendicular to $\vec{m}_x$ for offsetting the object between passes for a single layer. Ideally, the top surface of the build plate is parallel to the $\vec{m}_x \times \vec{m}_y$ plane, but in practice this is not the case, and the "tilt" of the build plate is significant enough to affect printing accuracy. Finally, the build plate is movable in a substantially vertical direction $\vec{m}_z$, which is approximately but not necessarily exactly perpendicular to the $\vec{m}_x \times \vec{m}_y$ plane. The frame of reference for the motion system is denoted by calibration values $\underline{m}=(\vec{m}_x, \vec{m}_y, \vec{m}_z)$.

A sensing system 118 (also referred to below as a "scanner" without any connotation that there is any particular form of traversal of the object being sensed) is used to determine the location of the surface of an object (e.g., a build plate or a partially fabricated object). In this embodiment, the scanner 118 includes a laser emitter 114, which produces a light plane 115 (shown in cross-section as a line 115 in FIG. 1), and a camera 115, which senses a location of an illuminated point on the surface. In FIG. 1, a central sight line 117 corresponds to a central pixel location on the image sensor of the camera, such that when an illuminated spot in the image is at the central pixel location, the location of the point is at the intersection of the light plane 115 and the central site line. Pixel offsets of the illuminated point in the camera image correspond to physical offsets along the light plane.

In a first calibration stage illustrated in FIG. 1, intersection of the illumination plane and the central sight line, and the direction of the illumination plane is denoted by calibration values $\underline{s}$. By moving the calibration build plate 120 over a controlled range of controls $\underline{\alpha}=(\alpha_x, \alpha_y, \alpha_z)$, which correspond to vector offsets of the build plate by $\underline{\alpha}\cdot\underline{m}$, and determining the illuminated pixels in the camera of the sensor, the first stage of calibration essentially establishes the location and orientation and scale of the sensor in the universal reference frame for the print. This calibration may be denoted $\underline{s}=(\vec{s}_0, \vec{s}_u, \vec{s}_v)$, where $\vec{s}_0$ is the three-dimensional location of the central pixel, and $\vec{s}_u$ and $\vec{s}^v$ are the directionally and scale calibrated such that a pixel location $\underline{c}=(u, v)$ in the camera corresponds to an absolute three-dimensional location (in physical units) of $\vec{s}_0+u\vec{s}_u+v\vec{s}_v$, which can be represented as $(1, \underline{c}) \cdot \underline{s}$. This calibration phase also establishes the directions and magnitudes of the motion directions. Not that because the calibration build plate is precisely fabricated and the separation and dimensions of the fiducial markers are known in physical units, the magnitudes of the motion direction vectors are calibrated such that the physical displacement of a controlled motion (e.g., a continuous speed or a sideway or vertical step offset) is controllable and/or known in physical units.

At the end of the first stage of calibration, a relationship of three quantities is known, allowing determination of any one of the other two. These quantities (when a fiducial point is illuminated by the scanner) are:
- $\underline{\alpha}=(\alpha_x, \alpha_y, \alpha_z)$, the control input for the location of the build platform,
- $\underline{\beta}=(\beta_x, \beta_y, \beta_z)$, the location of the fiducial marker on the build platform in the build platform reference frame, and
- $\underline{c}=(u, v)$, the pixel location of the illumination of the fiducial point in the camera sensor.

Further details regarding establishing such a calibration relationship are found in U.S. Pat. No. 10,994,490. Note that in some embodiments, this relationship is linear, while in other embodiments, the relationship may be non-linear, for example, to account for non-linear distortions that may occur in the optical system (e.g., the lenses) of the camera.

Figure 2:
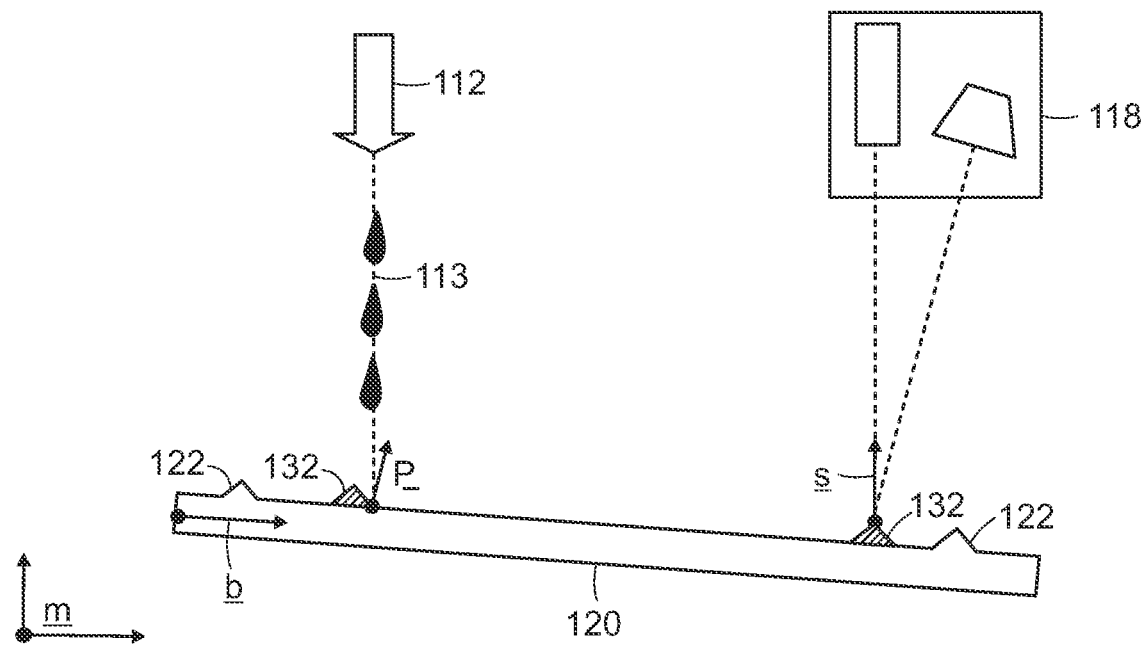
FIG. 2 is a schematic side view of the calibration plate including printed fiducial markers.

Referring to FIG. 2, a second optional calibration phase may be performed after the first stage. The goal of this stage is to establish the location (and orientation) of the printhead 112 relative to the scanner 118 and/or in the universal reference frame. Very generally, jets of the printhead 112 are controlled to emit material during motion of the build plate. For example, one or more fiducial markers 132 are formed using material ejected from a printhead (e.g., a support material, a curable build material, etc.). Because the fixed location of the printhead (e.g., relative to the scanner 118) is not precisely known, the precise locations of the fiducial markers are not known. Furthermore, the thicknesses of the deposited layers (e.g., different materials may yield different thicknesses) are not known, and therefore the height of the fiducial markers are also not known. Very generally, the geometry (i.e., locations, pattern in x×y plane, and/or dimensions) of the fiducial markers are determined using the scanner 118. A result of this calibration is that for each printhead, a location of a jetted material as it deposits on the moving build platform (considering the controlled location of the build platform at the time the material is ejected) is determined by scanning the location of the fiducial markers on the build platform. Note that because the build plate is constantly moving at a constant speed in the in the $\vec{m}_x$ direction, and the material travels at a finite velocity toward the build platform, the height of the surface on which the material deposits also determines where it deposits. For example, the closer the build platform is to the printhead, the sooner it reaches the build platform, and the greater the coordinate in the x direction is. Therefore, the calibration for a printhead not only establishes the location but also effectively a height-dependent "correction" to be applied to the location. Finally, although the jets of a printhead may in at least some embodiments be assumed to fall on a line at a known spacing, the orientation of that line is not necessarily perfectly aligned with any axes of the system. Therefore, the printhead calibration also takes this into account. For each printhead, the calibration for the printhead may be represented as $\underline{p}=(\vec{p}_0, \vec{p}_1, \vec{p}_2, d)$, where $\vec{p}_0$ is a location (e.g., when the motion system is at a "zero" offset) of the resulting deposit of material, $\vec{p}_1$ represents a direction of the height-dependent "correction," $\vec{p}_2$ represents a direction of the jet-dependent correction for jets along the printhead, and d represents the achieved thickness of each layer (or in the case of a variable output printhead, a parameter that relates the control of the amount of emission from the printhead and the achieved thickness). Note that there is, in general, a separate such calibration vector for each printhead. Also note that this calibration is for a specific velocity of motion of the build plate. In embodiments in which printing can occur in two directions (i.e., form right to left and from left to right in the schematic figures), separate calibrations may be performed for each direction (i.e., affecting at least $\vec{p}_0$ and $\vec{p}_1$ for the printhead), or the calibration may be parameterized by the velocity, direction, and or speed, of the build platform.

As a result of this second stage of calibration, the printhead 112 is calibrated relative to the scanner 118, which provides a basis for accurate vision-based feedback for fabricating an object on the build platform. For example, the relationship between
- $\underline{\alpha}=(\alpha x, \alpha_y, \alpha_z)$, the control input at the time of emission of the build platform, and,
- The line along which the emitted material approaches the surface where it is deposited, for example, represented by $\underline{\alpha} \cdot \underline{m}+\vec{p}_0+h\vec{p}_1+i\vec{p}_2$ where i is the index of the jet in the linear array of the printhead and h varies along the line the material passes and therefore depends on the height of the surface being deposited onto.

Further details regarding establishing such a calibration relationship are found in U.S. Pat. No. 10,994,490.

In the fabrication process described for this embodiment, the second stage of calibration is not required. Furthermore, the calibration build plate 120 is removed, and an empty fabrication build plate 220 is installed (for brevity, this fabrication build plate is referred to as "the build plate" below). Note that ideally, this build plate 220 would have the exact location and orientation on the motion system as the calibration build plate 120, but in general it may have a reference frame $\underline{b}$ (e.g., an orientation) that differs slightly from the calibration plate.

One aspect of the orientation is that the top surface of the build plate, even if perfectly planar, is not necessarily parallel to the $\vec{m}_x \times \vec{m}_y$ plane (the "motion plane") of the motion system. This means that if an object were to be fabricated on the build platform in the $\underline{b}$ reference frame, as the object passes under the printhead 112, and as it passes under the scanner 118, its distances to these elements changes. Calibration performed in the first and second stages described above can in principle be used to adjust the controlled emission of material to build the object "at an angle."

Figure 3:
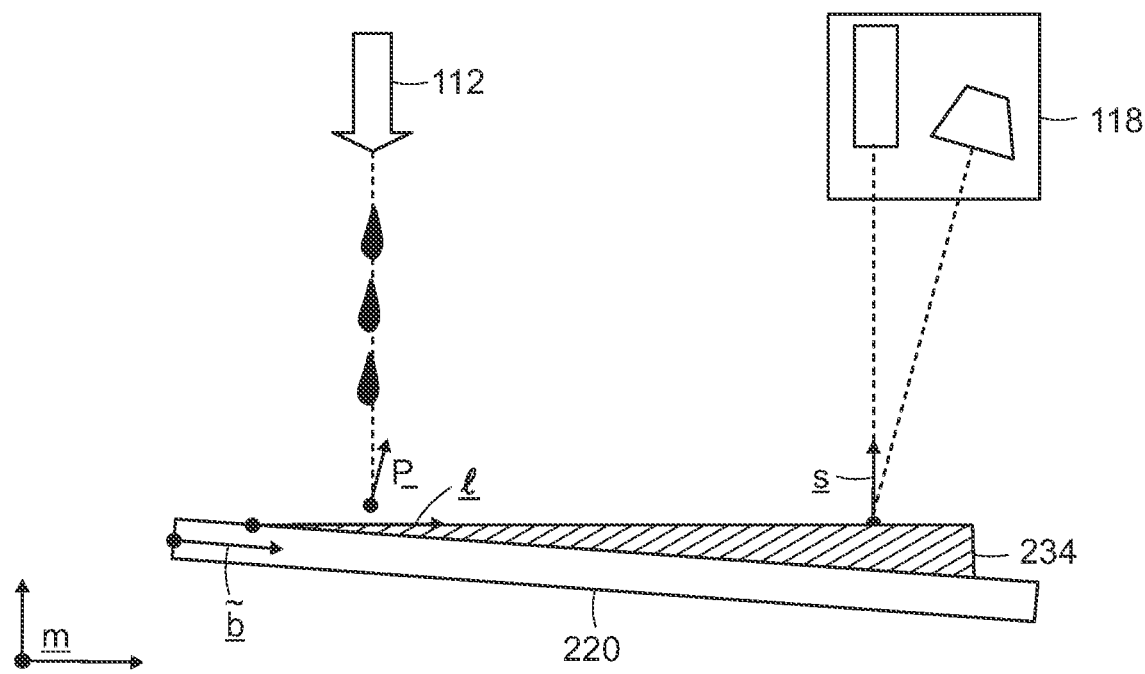
FIG. 3 is a schematic side view of a fabrication platform fabricated on a build plate.

Preferably, as illustrated in FIG. 3, in a gross exaggeration of scale, a fabrication platform (also referred to below as a "raft") 234 of support material is deposited in a manner such that its top surface is planar (even if the surface of the build plate is non-planar and/or rough) and parallel to the motion plane. After depositing of this raft, the motion of the build plate during a printing pass and in offsetting between passes for a particular layer does not change the separation between the printhead and the surface, or between the scanner and the surface.

One advantage of this parallel structure is that the separation between the printhead and the surface being printed on may be minimized without having to accommodate the highest point of the surface during a printing pass. Furthermore, by having a relatively constant distance, the height-based compensation determined during calibration (i.e., the $\vec{p}_1$ parameter value) is relatively less important.

An advantage of a relatively constant separation of the surface and the scanner is that a much smaller height range must be imaged, which in turn permits using a greater pixel resolution for that range and may exploit the optical elements in a narrower angular range yielding fewer optical distortions introducing non-linear imaging effects.

Note that forming of the raft 234 for the support material (e.g., a wax) does not necessarily require accurate calibration of the printhead. For example, upon the depositing of a first layer of the raft, the scanner can provide height variation data to a controller, which then instructs the printheads to vary the regions on which to deposit subsequent layers, ultimately reaching the parallel top surface that is desired. That is, only a gross calibration is required such that the material emission does not miss the build platform and that the raft makes use of a useful area of the build platform.

Figure 4:
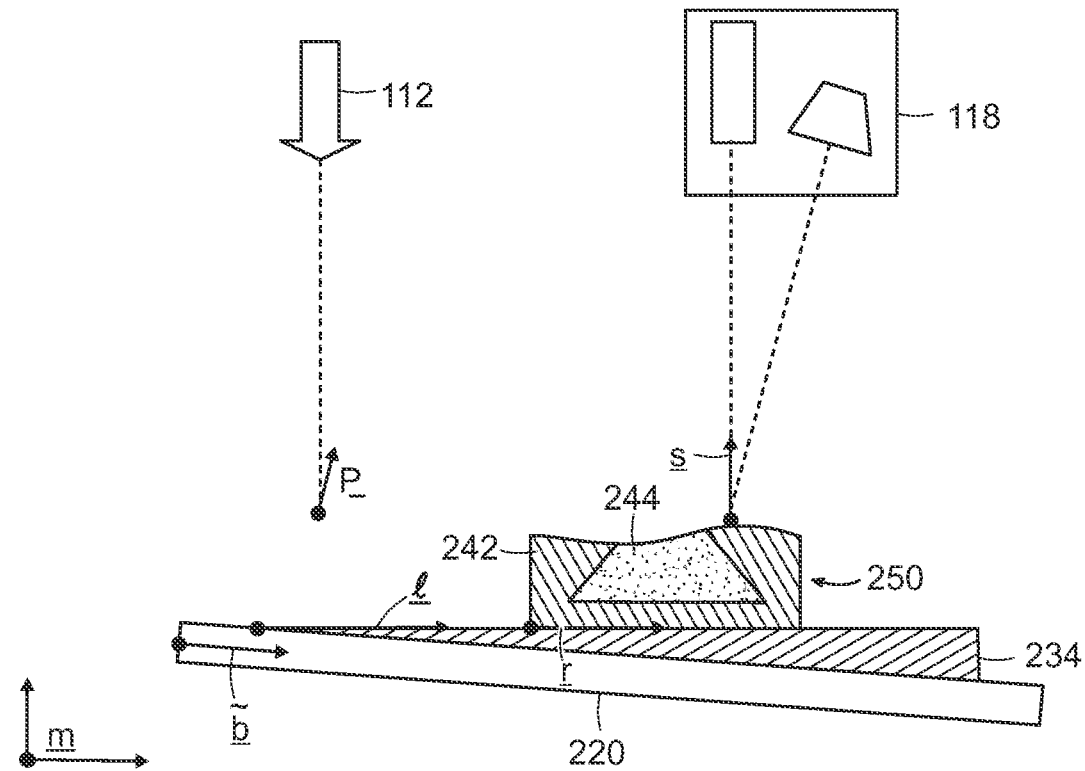
FIG. 4 is a schematic side view of a partially completed fabrication on an object on the fabrication platform.

Referring to FIG. 4, building of an object 250 can proceed, in this figure assuming that calibration of the printheads was previously performed, for example, as illustrated in FIG. 2. In this illustration, the object includes the support structure 242 for the object, and a desired object 244, which is built from a build material (i.e., a curable resin), and more generally build using multiple build materials. This object is defined in coordinate system illustrated as r in the figure, and a controller of the printer converts the geometric definition of the object in that reference frame to control of emission of the printheads in terms of the location of the motion system to yield the desired structure. Feedback from the scanner can also be represented in that reference frame yielding the feedback fabrication arrangement, for example, as described in U.S. Pat. Nos. 10,252,466 and 10,456,984.

Figure 5:
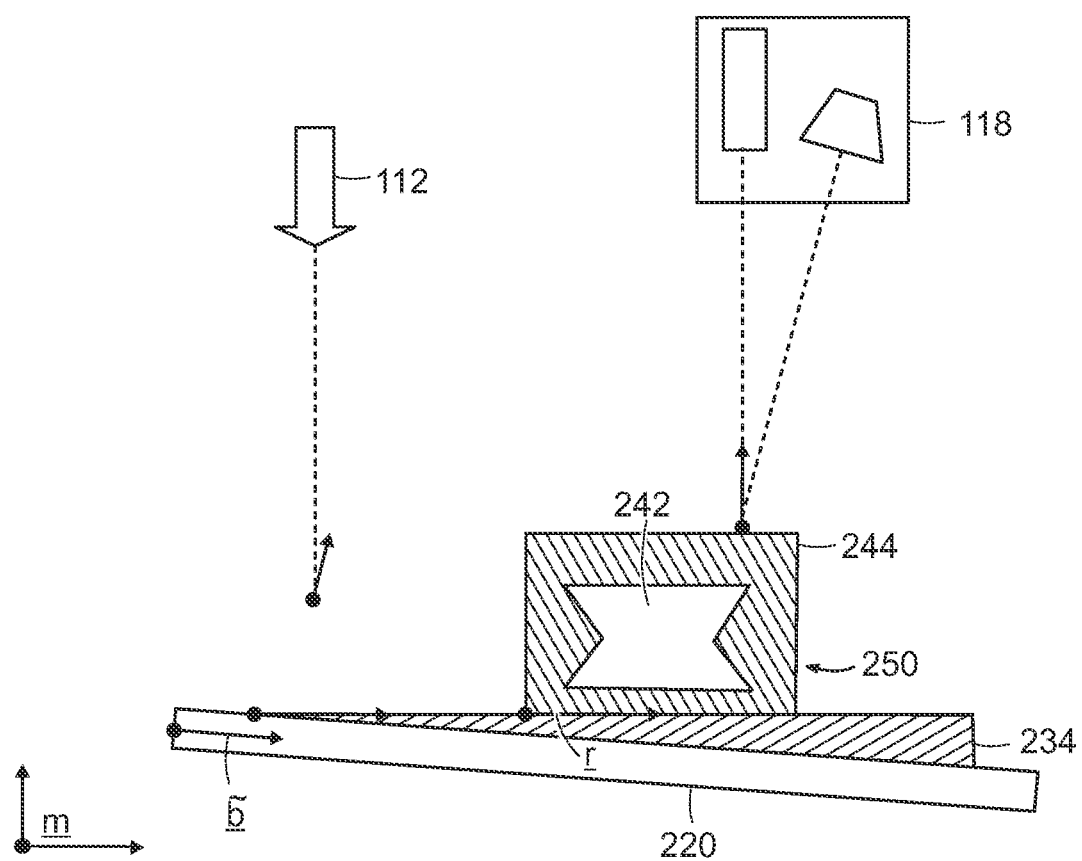
FIG. 5 is a schematic side view of a completely fabricated object on the fabrication platform.

Referring to FIG. 5, ultimately, the completed object is formed on the build plate 220. The build plate is removed from the printer, and the object 250 is detached from the build plate, for example, by heating, using a solvent, and/or using a mechanical means. A new blank build plate 220 is installed in the printer, and a new raft 234 is constructed on that build plate for fabrication of the next object, as illustrated in FIG. 3.

Figure 6:
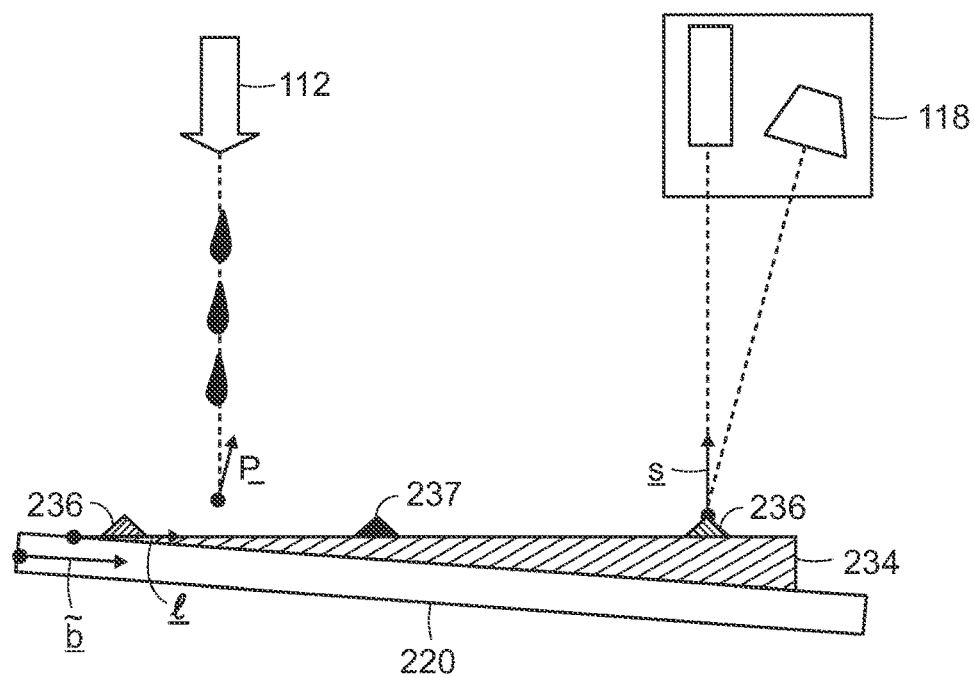
FIG. 6 is a schematic side view of the build plate including a fabrication platform and printed fiducial markers.
Figure 7:
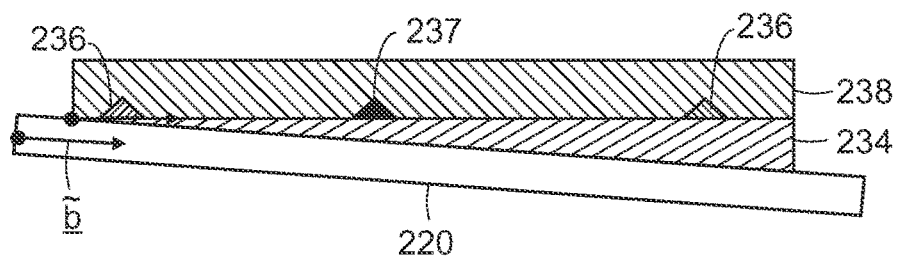
FIG. 7 is a schematic side view of the build plate including a fabrication platform and an incremental platform fabricated over the printed fiducial markers.

Referring to FIG. 6, instead of (or optionally as a refinement of) calibration of the printheads as illustrated in FIG. 2, calibration of the printheads is performed by forming fiducial markers 236, 237 on the top surface of the raft 234. For example, a representative fiducial marker 236 may be formed from a build material and a marker 237 may be formed from the support material (i.e., the same support material as the raft). More complex calibration patterns are generally formed on the surface, for example, as described in U.S. Pat. No. 10,994,490. Note that these markers are formed with the printhead separated from the surface in the range that will be used during fabrication (i.e., not necessarily exactly constant, but varying over a very small range, for example, resulting from non-unform deposition and/or quantization of vertical step adjustments that may be performed). After fabricating the fiducial markers, the data acquired by the scanner 118 is used to determine (or adjust) the printhead calibration parameters (e.g., $\underline{p}$ introduced above).

After scanning of the fiducial markers 236, 237, an incremental raft 238 may be formed to again yield a parallel surface on which to build the object. In some embodiments, this step is not needed, for example, to the extent that the fiducial markers are not formed throughout the surface leaving a usable surface on which to fabricate the object on the original raft 234.

Figure 8:
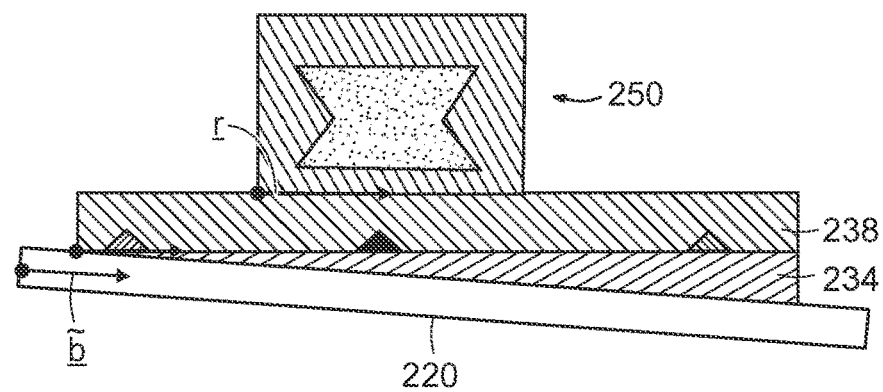
FIG. 8 is a schematic side view of a completely fabricated object on the incremental fabrication platform.

Referring to FIG. 8, the object 250 is then fabricated on top of the incremental raft, using the calibration performed for this build plate.

Note that this sort of repeated calibration for each build plate can have yet other advantages than those introduced above. For example, a slight disturbance of the relative location of the printheads and the scanner can be accommodated. Such a disturbance may result from mechanical jarring of the printer, or cleaning of the printheads. The re-calibration may also address aspects such as deviation of the amount of material deposited from each printhead, for example, resulting from partial clogging of printheads and/or changes in fluid properties (e.g., viscosity) of the jetted materials.

In some embodiments (not illustrated), it is possible to deposit fiducial markers part-way through the fabrication process, for example, near the periphery of the support material 244 of the object to adjust the calibration in case there was a mechanical change during the fabrication of a single object.

Figure 10:
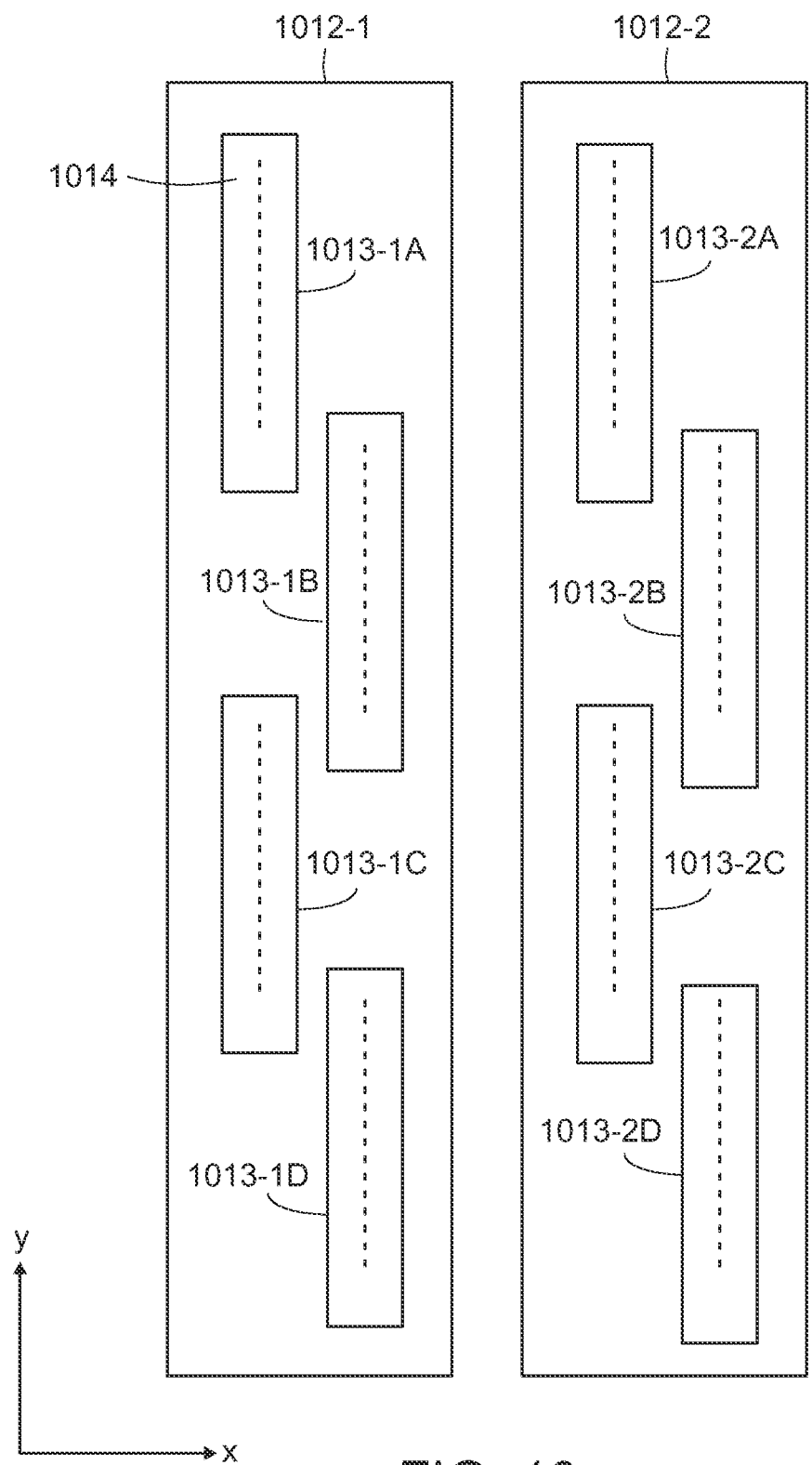
FIG. 10 is a view of a multiple printhead assemblies.

Referring to FIG. 10, in some embodiments, the printhead 112 shown schematically in FIGS. 1-6 is composed of a set of printhead assemblies 1012-1, 1012-2, each used to emit a corresponding material, for example with assembly 1012-1 being used to emit support material and assembly 1012-2 being used to emit build material. Each assembly has a set of printheads, for example, assembly 1012-1 has printheads 1013-1A through 1013-1D. Each printhead is manufactured to have a set of jets 1014, each of which is individually controllable. In the illustration, each printhead is shown with a linear array of nine jets, but in practice the printheads may have hundreds of jets, and they may be arranged in a different pattern than a single linear array, for example, being arranged in several rows of linear arrays. The arrangement of the jets in a printhead is known, and in general can achieve a uniform spacing along the printhead, for example, with one jet per 60 microns. In this example, although the arrangement of the jets in each printhead is assumed known, the exact placement of the printheads relative to one another is not precisely known, nor is the exact relative position of the printhead assemblies. It should be noted that although the printhead assembly as shown in the figure provides a wider print path than can be achieved with a single printhead, printing in general involves multiple passes to deposit a single layer of an object, offsetting the entire printhead (i.e., all the printhead assemblies) relative to build platform between the passes for the layer.

In an example that makes certain simplifying assumptions, the printheads are assumed to be precisely aligned in the "y" direction, which is the direction perpendicular to the direction of relative motion (denoted $\vec{m}_x$ in FIG. 1) during printing passes. This alignment may be the result of precise manufacturing of the printer or may be achieved by manual adjustment using a calibration process. Also, when calibration is performed on the "raft" (e.g., raft 234 introduced in FIG. 3), the range of height variation is not substantial, and therefore height variation in the calibration of the printheads to the build surface (i.e., the surface of the partially fabricated object positioned vertically to receive a layer of material) is assumed to be insensitive to the relatively minor variations in height (i.e., distance to the jets) of the build surface.

Continuing to refer to FIG. 10, calibration of the printhead involves determining spatial mapping (e.g., 2D homographies) between the location of a reference jet in each printhead and the reference frame of the raft, generally corresponding to the coordinate of the quantity $\vec{p}_0$ introduced above in the plane of the raft (i.e., an x and y value). Because each printhead is assumed aligned, this offset essentially defines the offsets of all the jets of that printhead. What is further needed for calibration is the offset between different printheads of a printhead assembly, and the offset between different printheads and/or their printhead assemblies.

Figure 11:
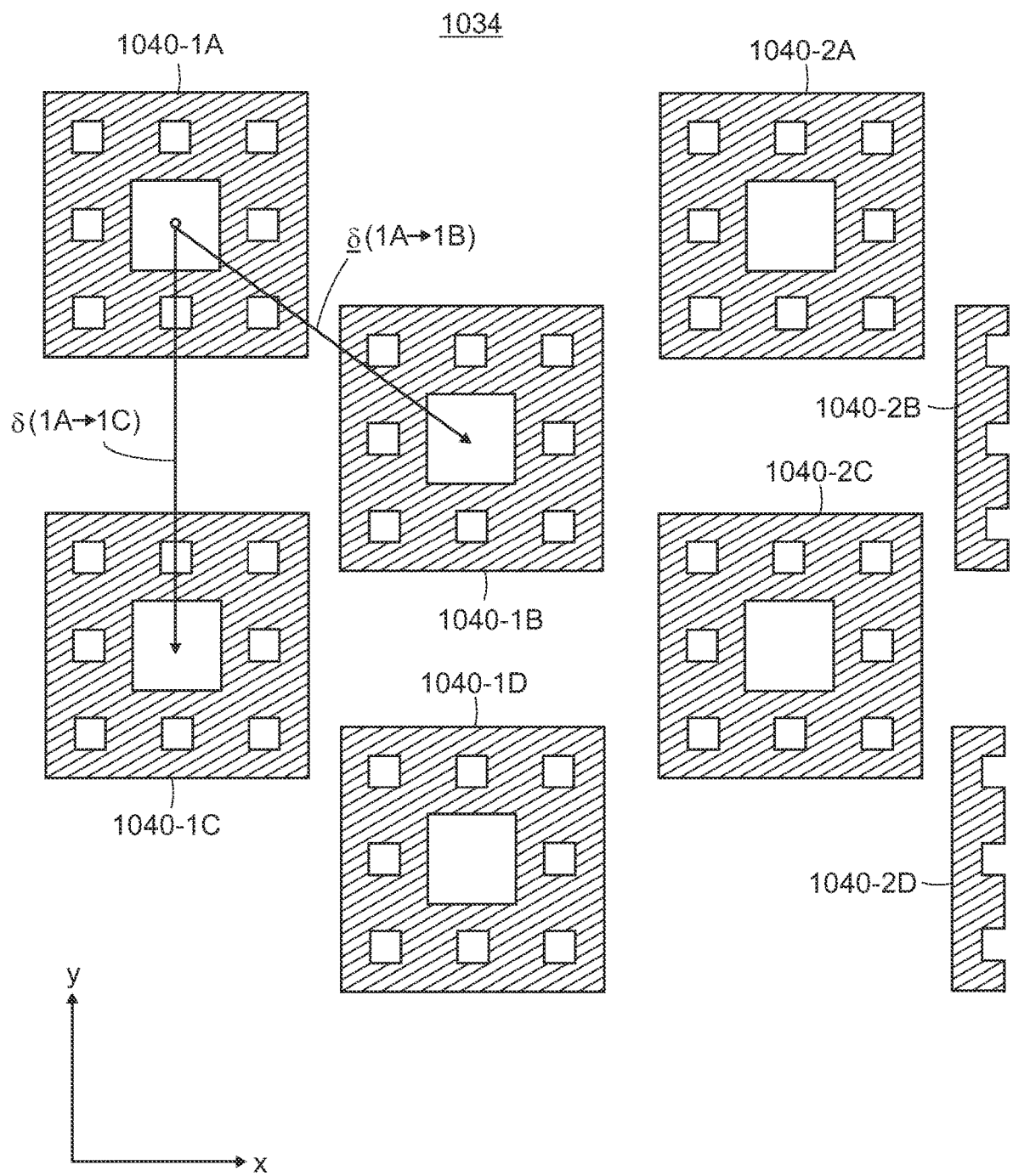
FIG. 11 is a view of a set of printed fiducial marks.

Referring to FIG. 11, one approach to determining the offsets between printheads is to print fiducial markers on the surface 1034 of the raft, generally corresponding to the printing of markers 236-237 as introduced with reference to FIG. 6. In this example, the markers essentially function as targets arranged in a checkerboard pattern on the surface of the raft. For example, at least one reference pattern (with one or more layers of thickness) is printed with each printhead, as illustrated in FIG. 11 with patterns 1040-1A, . . . 1040-1D, 1040-2A, . . . 1040-2D being printed with printheads 1013-1A, . . . 1013-1D, 1013-2A, . . . 1040-13, respectively.

Based on the scanning of the printed markers, the relative positions, such as illustrated displacements $\underline{\delta}(1A{\rightarrow}1B)$ and $\underline{\delta}(1A{\rightarrow}1C)$, are computed from the scan, for example, using an image correlation approach to best align the printed patterns. Note that the selection of the pattern to be printed may be made to make such alignment as accurate as possible. Having determined the relative positions between the printhead assemblies in the motion direction ($\vec{m}_x$) printing to achieve placement of material at desired locations long the motion direction is achieved. Note that this process is performed twice, with the markers being printed in both print directions, and this calibration along the motion direction being determined, recorded, and used separately for the two printing directions.

Calibration along the perpendicular direction uses a similar approach, with the added features that the offsets in this perpendicular direction are quantized to be an integer number of jet spacings. In this way, the jets of each printhead assembly are calibrated to map to a uniform spacing (e.g., every 60 microns) on the print surface and complexity involved with fractional alignment is ignored without any significant affect on print quality.

Returning to optional alignment of the printheads relative to (i.e., perpendicular to) the direction of motion, one approach makes use of printing of fiducial markers as shown in FIG. 11, with rotation of the marks being determined by processing the scan after printing of the markers, and a computer controlled mechanism (e.g., a stepper motor controlling alignment) or using an instruction to a human operator (e.g., to turn a thumb screw an amount that causes alignment).

Referring to FIGS. 9A-E, as introduced above, the raft 234 upon which the object is fabricated may be formed from support material, such as a wax material. An advantage of using such a material at the interface with the build plate 220 is that it is, in general, easily detached from the build plate. However, this detachability characteristic may be undesirable during the fabrication process because it can result in the raft partially detaching (e.g., "curling up" at the edges) resulting in inaccuracies in fabrication.

Figure 9A:
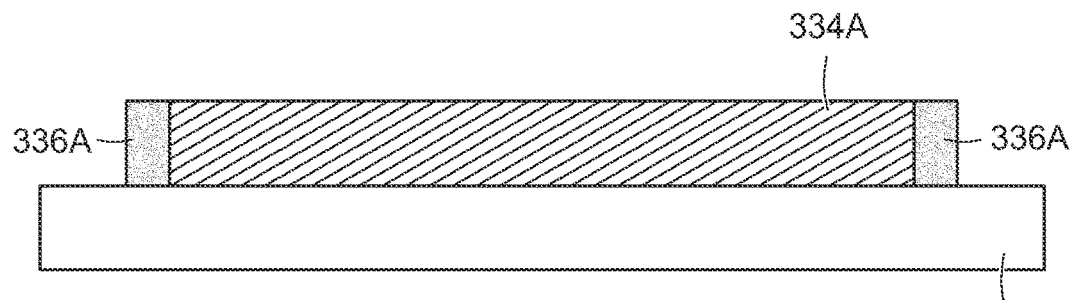
FIGS. 9A-E are schematic side views of fabrication platforms formed in contact with alternative forms of edge elements.

Referring to FIG. 9A, one approach to building a raft is to form an edge 336A (also referred to as an edge element, or a "moat") around the periphery of the raft 334A from a material that adheres more firmly to the build plate 220 than the support material. The contact area between the edge and the build plate is relatively small, making it possible to remove from the build plate after fabrication, for example, by mechanical, fluid "washing" action, and the like. However, limiting the contact area as illustrated in FIG. 9A may not yield sufficient mechanical restraint of the raft 334A to keep it from detaching from the build plate during fabrication.

Figure 9B:
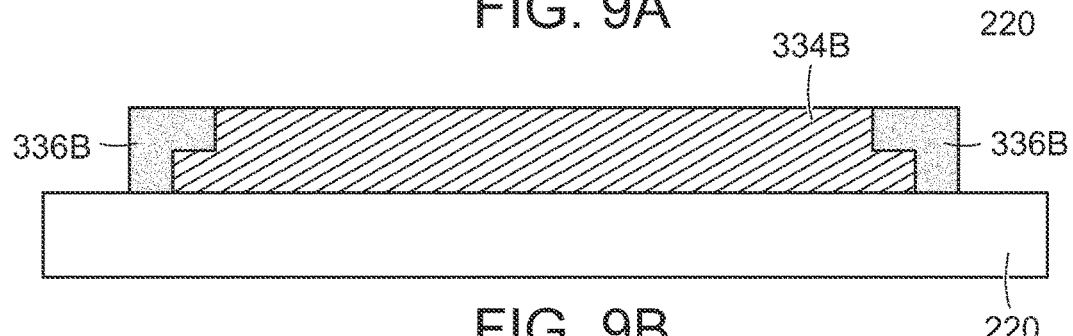
Figure 9C:
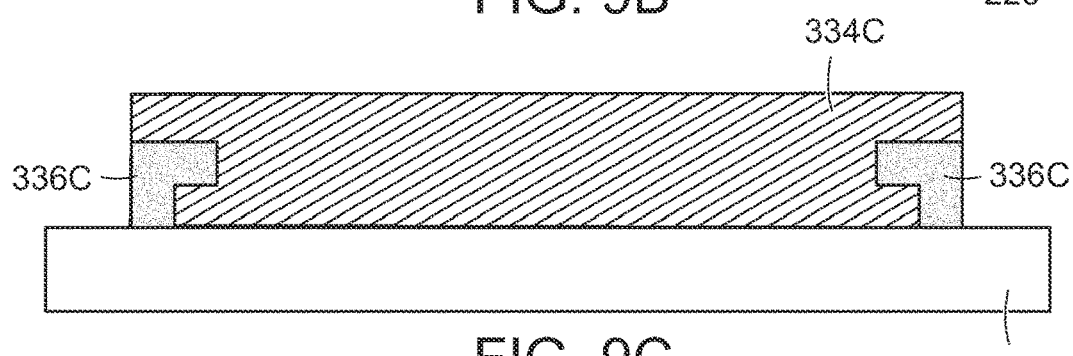
Figure 9D:
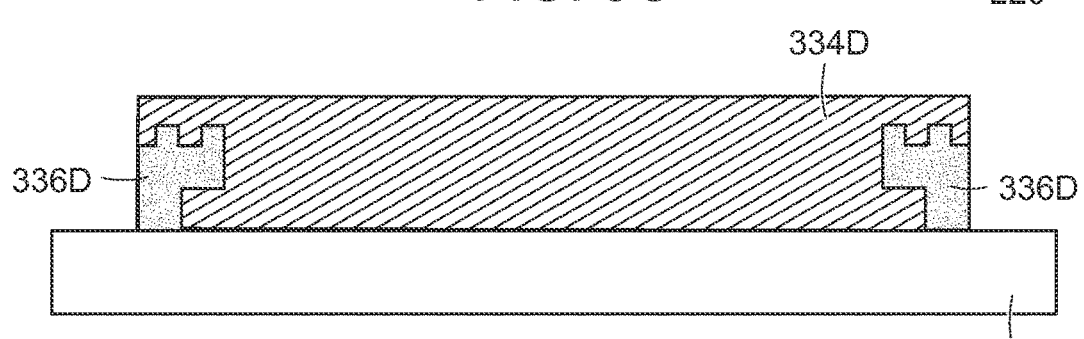
Figure 9E:
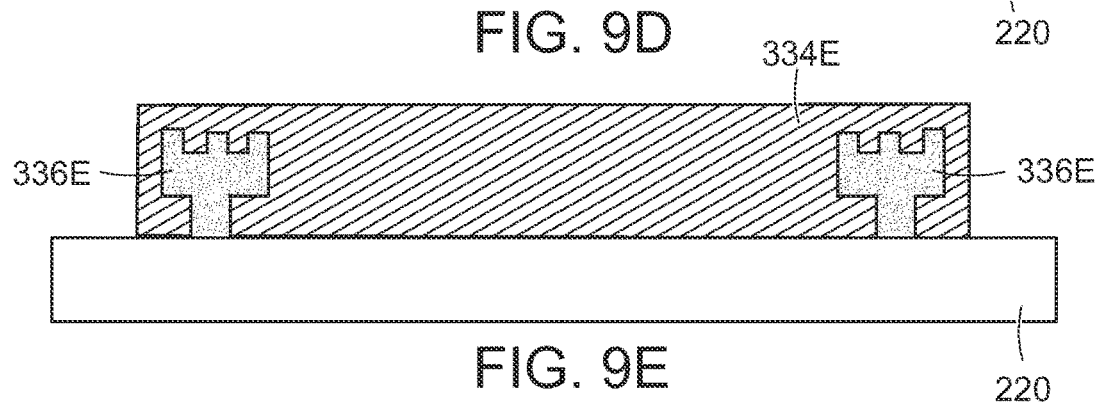

Referring to FIG. 9B, an alternative structure for an edge 336B maintains a relatively limited contact area with the build plate, but introduces a shape intended to hold the raft 334A on the build plate. The edge 336C shown in FIG. 9C further has part of the raft 334C built on top of it, which provides a top surface that is entirely support material and increases the contact area between the edge 336C and the raft 334C, thereby increasing the holding of the raft by the edge. The edge 336D of FIG. 9D further adds detailed structure on the edge 336B to increase the mechanical coupling between the edge and the raft, and the edge 336E of FIG. 9E further increase the area of contact between the raft and the edge, without increasing the contact area between the edge and the build plate. These are merely examples, and a wide variety of structures and/or materials may be used to support the raft. Furthermore, in some embodiments, the build plates themselves may incorporate similar edges (e.g., made of the same material as the build plate, or a different material that may provide a firmer contact with the support material), thereby avoiding the need to remove them between uses of the build plate.

Embodiments described above may make use of a hardware controller coupled to the printhead, sensing system (e.g., scanner), and motion system. The controller during operation causes steps described above to be performed. For example, the controller is a general-purpose computer that executes software applications. The controller may executed software instructions that are stored on a computer-readable medium, such that when the software instructions are executed, the steps described above are performed and/or caused to be performed. In some embodiments, in addition to or instead of a controller, circuitry (e.g., ASICs, FPGAs, and the like) are used to implement steps of the method.

Several embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for calibration of an additive fabrication system, comprising:
   fabricating a fabrication platform (234) on a first build plate (220) by the additive fabrication system, wherein a top surface of the first build plate is nonparallel to a motion plane of a motion system for controllably moving the first build plate, a top surface of the fabrication platform (234) being substantially parallel to the motion plane of the motion system;

calibrating the additive fabrication system including determining first geometric relationships between a printhead (112), a sensing system (118), and the motion system; and fabricating an object (250) on the fabrication platform (234) according to the determined first geometric relationships;

wherein calibrating the additive fabrication system includes fabricating a plurality of markers (236, 237) on the fabrication platform (234), the plurality of markers positioned on the top surface of the fabrication platform parallel to the motion plane of the motion system, and wherein determining the first geometric relationships includes sensing said markers using the sensing system.

2. The method of claim 1, wherein the fabricating of the object comprises depositing successive layers of material, and wherein said depositing a layer comprises continuously moving the object relative to the printhead along the motion plane of the motion system causing the distance between the printhead and a surface of the object to remain substantially constant.

3. The method of claim 1, wherein the printhead comprises a printhead assembly (1012-1) having a plurality of printheads (1013-1A to 1013-1D), and wherein the calibrating of the additive fabrication system includes fabricating a plurality of markers (1040-1A to 1040-1D) with the printheads.

4. The method of claim 3, wherein the calibrating of the additive fabrication system further includes determining relative locations of the plurality of markers from a scan of the fabrication platform after the fabricating of the plurality of markers.

5. The method of claim 1, further comprising:

prior to the fabricating of the fabrication platform, determining second geometric relationships between the motion system and a second build plate, wherein the second build plate has a nonparallel top surface with respect to the motion plane of the motion system.

6. The method of claim 5, wherein the determining of the second geometric relationships comprises scanning a plurality of markers formed in the second build plate.

7. The method of claim 6, wherein the second build plate is a separate build plate, and the second build plate is removed from the fabrication system and the first build plate is installed in the fabrication system prior to fabrication of the fabrication platform on the first build plate.

8. The method of claim 1, wherein the fabricating of the fabrication platform comprises fabricating said platform using a support material.

9. The method of claim 8, wherein the forming of the fabrication platform includes forming said platform in contact with an edge element (336A-E) for bonding the fabrication platform to the first build plate.

10. The method of claim 9, further comprising fabricating the edge elements on the first build plate.

11. The method of claim 1 wherein fabricating the fabrication platform (234) includes fabricating the fabrication platform with a nonuniform thickness.

12. The method of claim 1 wherein the top surface of the fabrication platform is positioned in a sensor region of the sensing system as the motion system moves the first build plate along the motion plane of the motion system.

13. The method of claim 1, wherein the calibrating of the additive fabrication system includes fabricating a plurality of markers on the fabrication platform using a plurality of printheads, the plurality of markers positioned on the top surface of the fabrication platform parallel to the motion plane of the motion system, the calibrating further including determining a plurality of geometric relationships between the plurality of printheads, the sensing system, and the motion system using the plurality of markers.

14. An additive fabrication system comprising:

a printhead (112);

a sensing system (118);

a motion system for controllably moving a first build plate relative to the printhead; and a controller configured to cause:

fabrication of a fabrication platform (234) on a first build plate (220), wherein a top surface of the first build plate is nonparallel to a motion plane of a motion system for controllably moving the first build plate, a top surface of the fabrication platform (234) being substantially parallel to the motion plane of the motion system;

calibration of the additive fabrication system including determining geometric relationships between a printhead (112), a sensing system (118), and the motion system, the calibration being based at least in part on sensing of a plurality of markers fabricated on the fabrication platform (234) fabricated on the first build plate (220);

wherein calibration of the additive fabrication system includes fabricating the plurality of markers (236, 237) on the fabrication platform (234), the plurality of markers positioned on the top surface of the fabrication platform parallel to the motion plane of the motion system, and wherein determining the first geometric relationships includes sensing said markers using the sensing system; and fabrication of an object (250) on the fabrication platform (234) according to the determined geometric relationships.

15. The additive manufacturing system of claim 14 wherein the controller is configured to cause the fabrication platform (234) to have a nonuniform thickness.

* * * * *